United States Patent [19]

Houseknecht

[11] 4,200,368

[45] Apr. 29, 1980

[54] SLIDE PRESENCE SHUTTER LOCK

[75] Inventor: Keith J. Houseknecht, Vestal, N.Y.

[73] Assignee: The Singer Company, New York, N.Y.

[21] Appl. No.: 962,407

[22] Filed: Nov. 20, 1978

[51] Int. Cl.² .............................................. G03B 23/00
[52] U.S. Cl. ......................................................... 353/88
[58] Field of Search ....................... 353/88, 89, 90, 91, 353/92, 93

[56] References Cited

U.S. PATENT DOCUMENTS

| 3,138,062 | 6/1964 | Maiershofer | 353/88 |
| 3,334,544 | 8/1967 | Zillmer | 353/92 |
| 3,411,845 | 11/1968 | Pester et al. | 353/88 |
| 3,876,298 | 4/1976 | Hickey | 353/88 |

Primary Examiner—John W. Shepperd
Attorney, Agent, or Firm—Charles R. Lewis

[57] ABSTRACT

A slide projector located within a rear-screen projector housing has a slide tray and slide positioning mechanism, which includes a shutter and slide clamp control portion, in cooperative relation with a gravity feed slide tray which is removably mounted on the rear-screen projector housing. Incorporated within the projector is a slide gate and a shutter for blocking the optical path during changing of the slide. Also included therein is a means for detecting the presence, or absence, of a slide which retains the shutter in the blocking position when a slide is absent from the slide gate.

11 Claims, 8 Drawing Figures

SLIDE PRESENCE SHUTTER LOCK

DESCRIPTION

BACKGROUND OF THE INVENTION

This invention relates to slide projectors and more particularly to the shutter and control mechanism therefor in relation to the presence or absence of a slide.

In using a slide projector, it is desirable for the viewing screen to be unlit during the changing of slides and when there is an empty slide position in the slide tray. To this end, a shutter is incorporated within the projector which blocks the optical path of the projecting light while the projector is indexing between slide positions in the slide tray. Mechanism is also included such that the shutter remains in its blocking position when the projector encounters an empty slide position in the slide tray. U.S. Pat. No. 3,876,298 to Hickey discloses a slide projector having these features wherein a slide clamp, which presses a slide to a slide guide, also senses the absence of a slide and, through suitable linkage, inhibits the opening of the shutter. However, since this mechanism senses the thickness of the slide, the adjustment thereof is highly critical and an unusually thin slide may trip the mechanism.

SUMMARY OF THE INVENTION

The object of this invention is to provide a means for detecting the presence, or absence, of a slide which is relatively insensitive to variations in the thickness or width of the slide, exerts a minimum amount of force on the slide to establish registry, and which is easy to adjust. This object is achieved in a slide projector having a frame with an opening therethrough coaxial with the optical path of the projector. A slide receiving gate is formed in the frame transverse to the optical path. Adjacent the gate is a pivotally mounted shutter having means attached thereto for controlling the opening and closing of the shutter. Slide sensing means are further included to register a slide and to detect the presence, or absence, of a slide, and include a pivotally mounted member for engaging a slide within the gate and for selectively engaging the shutter control means for inhibiting the opening of the shutter when a slide is absent.

DESCRIPTION OF THE THE DRAWINGS

With the above and additional objects and advantages in mind as will hereinafter appear, the invention will be described with reference to the drawings of the preferred embodiment in which.

DESCRIPTION OF THE PREFERRED EMBODIMENT

Figure 1:
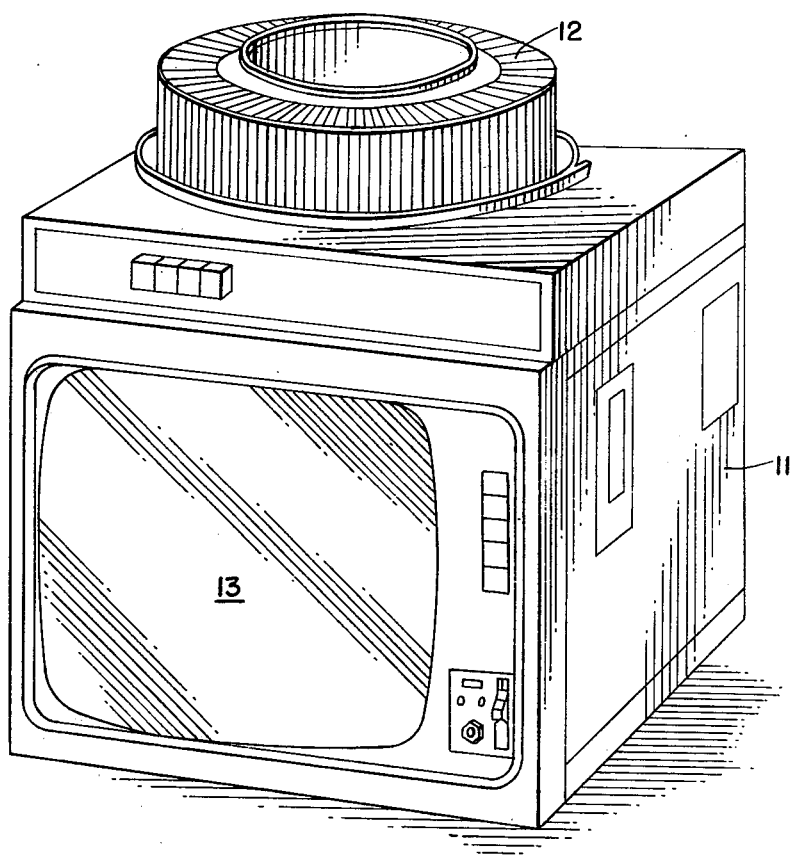
FIG. 1 is a perspective view of a rear-screen projector in which the invention is incorporated.
Figure 2:
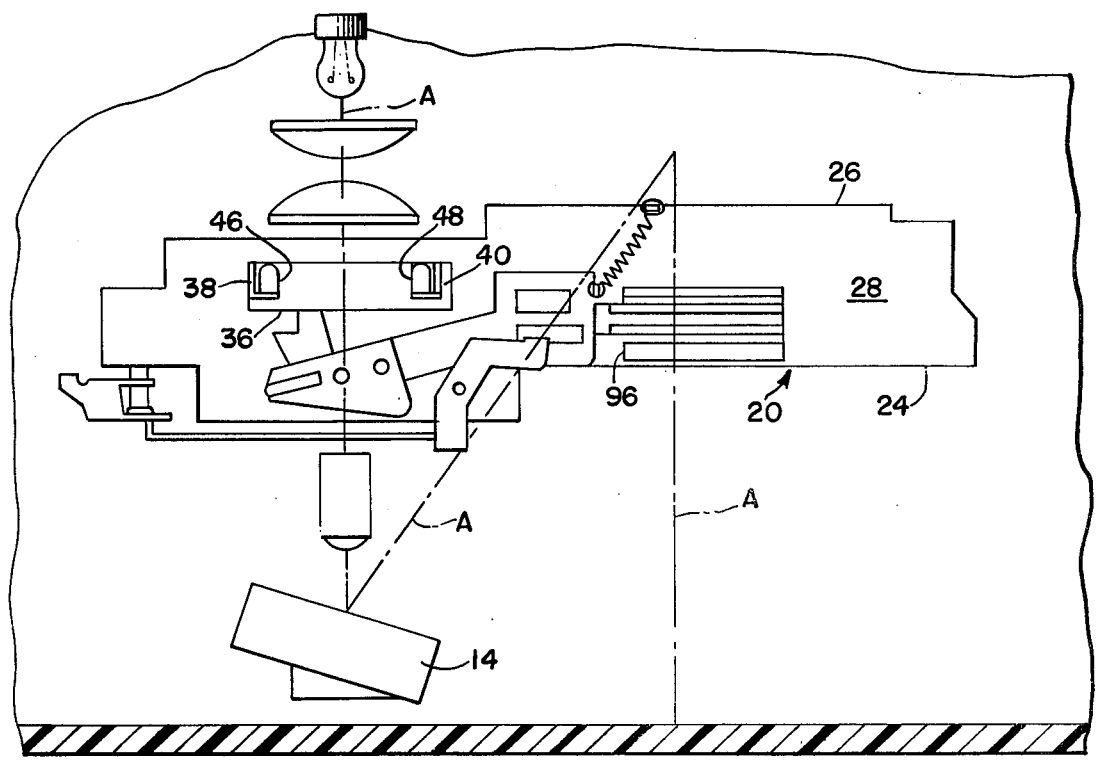
FIG. 2 is a top plan view of the rear-screen projector with the top cover removed.
Figure 3:
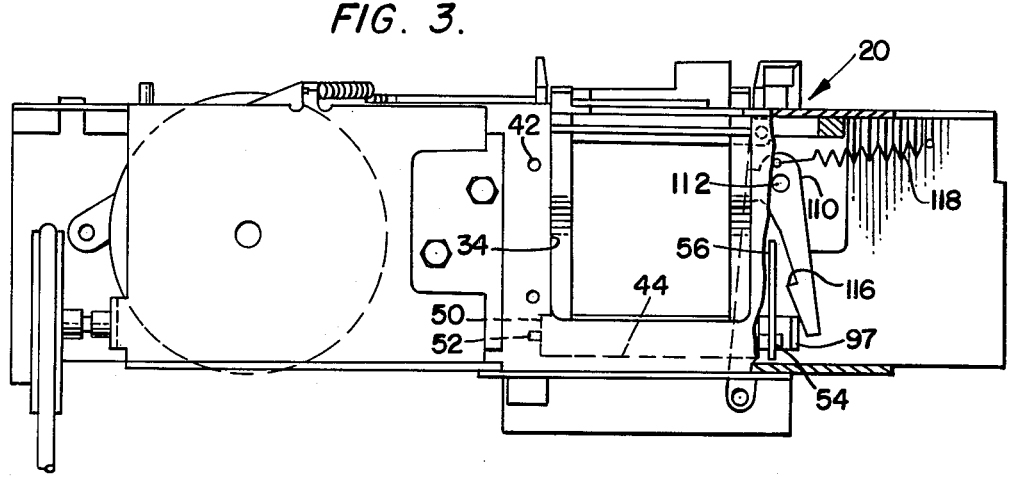
FIG. 3 is a rear elevational view of the slide tray and slide positioning mechanism containing the invention.
Figure 4A:
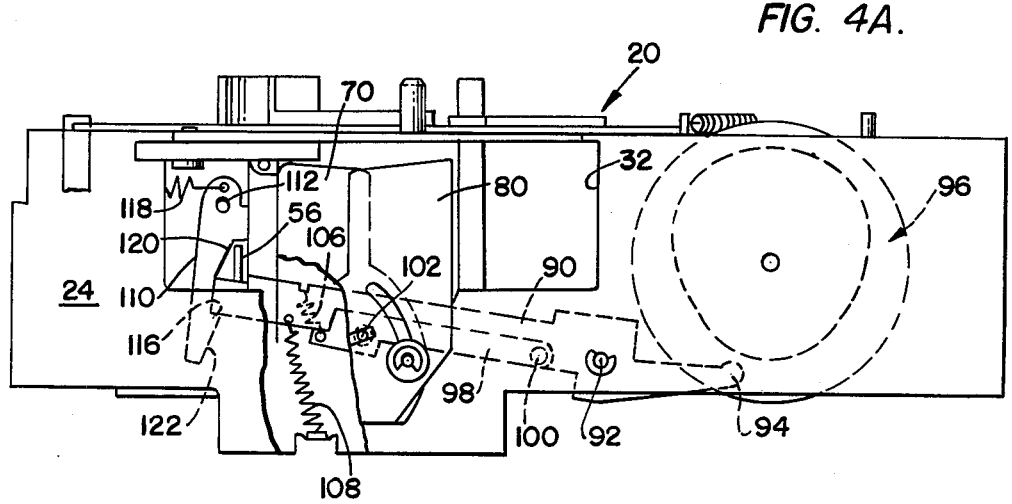
FIG. 4A is a front elevational view of the slide tray and slide positioning mechanism containing the invention with the shutter in a closed position.
Figure 4B:
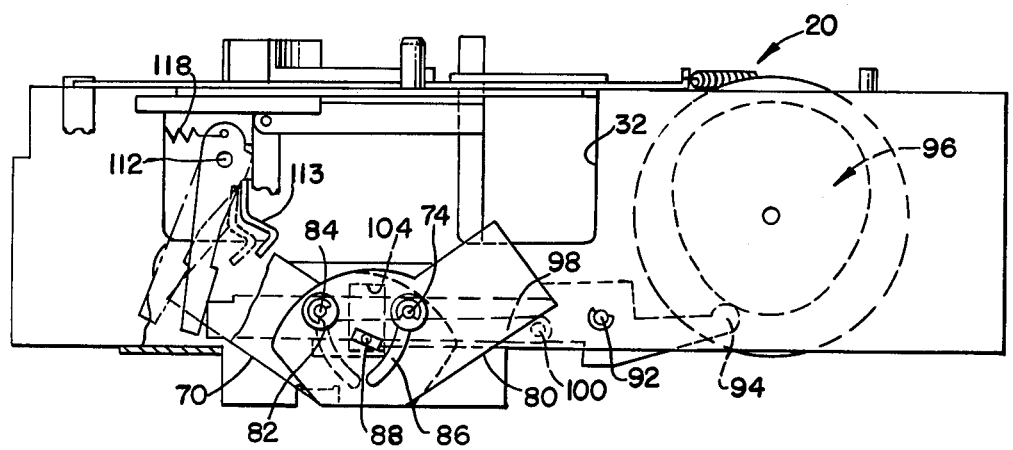
FIG. 4B is a front elevational view of the slide tray and slide positioning mechanism as in FIG. 4A with the shutter in an open position.
Figure 5:
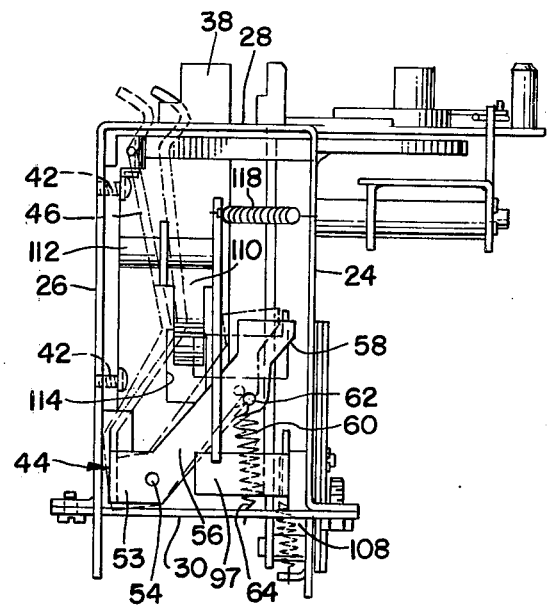
FIG. 5 is a left side elevational view of the slide tray and slide positioning mechanism showing the invention incorporated therein.

Apparatus which may utilize the present invention is shown in FIG. 1 as comprising a rear-screen projector having a housing 11 in the general shape of a cube. A gravity feed slide tray 12 is removably mounted on the top of the rear-screen projector. Located within the housing 11 beneath the slide tray 12 is a slide tray and slide positioning mechanism 20 (see FIG. 2) which includes a shutter control mechanism and the slide presence shutter lock of this invention. The slide projector projects the image of successive slides in the slide tray onto the rear of a viewing screen 13 contained in the front of the rear-screen projector housing 11. Since the screen 13 is located near the slide being projected, it is necessary that the optical path A of the projector be folded one or more times before reaching the screen 13. This is accomplished by the use of one or more mirrors 14 within the housing 11 in a well known manner. This enables a much larger image to be obtained on the viewing screen 13 than could be obtained within the confines of the projector housing 11 without folding the optical path of the projected image.

The foregoing is a general description of the rear-screen slide projector which is substantially similar to that described in U.S. Pat. No. 3,876,298 of Hickey to which reference may be had for greater detail.

As stated above, the slide tray and slide positioning mechanism 20 is located beneath the slide tray 12 and includes a rectangular frame having front and rear panels, 24 and 26 respectively, and upper and lower panels, 28 and 30 respectively. Apertures 32 and 34 are formed in the front and rear panels, 24 and 26, respectively, aperture 34 being coaxial with the optical path A of the projector, and aperture 32 being offset but including a coaxial area similar to aperture 34.

The slide tray and slide positioning mechanism 20 includes a slide gate for the receiving and retention of slides. The slide gate includes an elongated opening 36 formed in the upper panel 28 directly above and transverse to the optical path A of the projector. A left and a right slide guide, 38 and 40 respectively, are situated vertically between the upper and lower panels 28 and 30, at opposite ends of the opening 34. The slide guides 38 and 40 are mounted to the rear panel 26 on opposite sides of the aperture 34 by means of screws 42. The slide gate further includes a slide clamp 44 for securing each slide against the slide guides 38 and 40. The slide clamp 44 has the general shape of a "U" in which two upstanding legs 46 and 48 are used to clamp the slides against the slide guides 38 and 40. A bottom portion of the clamp 44 extends past the legs 46 and 48 and includes a first tab 50 on one end which is folded around the right slide guide 40 and pivotally engages a pin 52 formed in the guide 40. A second tab 53 on the other side of the bottom portion of the clamp 44 wraps around the left slide guide 38 and engages a second pin 54 formed in the guide 38. The tab 53 extends upwardly from the pivot pin 54 and forms an actuating arm 56 which has at the end thereof a camming surface 58, the purpose for which will be explained later. A spring 60 attached to the actuating arm 56 at 62 and to the lower panel 30 at 64 biases the slide clamp 44 such that the legs 46 and 48 thereof are urged against the slide guides 38 and 40.

Figure 7:
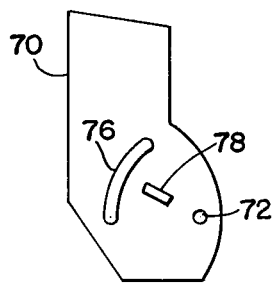
FIG. 7 is an elevational view of one of the shutter elements.

A shutter is provided for selectively blocking the optical path A. The shutter includes two cooperating members 70 and 80 arranged in overlapping relation on the front panel 24. The member 70 is formed with a hole 72 therethrough for pivotally mounting the member 70 to a pivot pin 74 on the front panel 24, and an arcuate slot 76 for slidably engaging a pivot pin 84, also on the front panel 24 (see FIG. 7). A registering slot 78 is formed in the member 70 midway between the hole 72 and the arcuate slot 76 and has the center line thereof along a line extending between the hole 72 and the midpoint of the arcuate slot 76. The member 80 is similarly formed with a hole 82 for the pivot pin 84 and an arcuate slot 86 for the pivot pin 74 and a registering slot 88. When the shutter members 70 and 80 are properly mounted to the front panel 24, a portion of each of the registering slots 78 and 88 will overlie the other when the shutter members 70 and 80 occupy complimental positions. A compound lever is provided for controlling the shutter members 70 and 80 and includes a first lever 90 pivotally mounted to the inside of the front panel 24 on pivot pin 92, having one end extending from pin 92 and formed with a projection 94 for engaging a shutter actuating cam 96 driven by a projector motor (not shown). The other end of the first lever 90, extending oppositely from pin 92, is formed in a tab 97. A second lever 98 is pivotally mounted at one end thereof to the first lever 90 on pivot pin 100 which is located near the pin 92 opposite the projection 94. The second lever 98 has a pin 102 secured in the free end thereof which extends through a vertical slot 104 formed in the front panel 24 beneath the aperture 32 and engages the registering slots 78 and 88 in the shutter members 70 and 80, respectively. Consequently, the pivoting motion of the second lever 98 is transferred to the shutter members 70 and 80 by means of the registering slots 78 and 88 respectively, causing the shutter members 70 and 80 to pivot about the pivot pins 74 and 84, respectively. The slot 104, through which the pin 102 projects, is of such a length as to limit both the upward pivotal motion of the second lever 98, corresponding to a first shutter position in which the optical path A is blocked, and the downward pivotal motion of the second lever 98, corresponding to a second shutter position in which the optical path A is not blocked. A first spring 106 is attached between the first and second levers, 90 and 98, and urges the second lever 98 to move with the first lever 90, and also allows additional upward pivotal movement of the first lever 90 after the pin 102 in the second lever 98 engages the top of the slot 104, the purpose for which will be explained later. A second spring 108, attached between the first lever 90 and the front panel 24, biases the first lever 90 downwardly, urging the projection 94 into engagement with the shutter actuating cam 96. The biasing of the first lever 90 also results in the shutter members 70 and 80 being biased toward the second shutter position.

The slide tray and slide positioning mechanism 20 further includes a device for sensing the presence, or absence, of a slide in the slide gate, and for laterally registering a slide in the slide gate. The device is comprised of a member 110 pivotally mounted to the left slide guide 38 on a pivot pin 112 along an axis parallel to the optical path A. The member 110 is formed with a feeler means 113 which may be selectively introduced into the slide gate through an opening 114 formed in the left slide guide 38. The member 110 is further formed with latch means 116 which may selectively engage the tab 97 of the first lever 90 when the first lever 90 is in a raised position, corresponding to the first shutter position. The relationship between the feeler means 113 and the latch means 116 is such that when the feeler means 113 protrudes through the opening 114 in the left slide guide 38, the latch means 116 is in a position in which it may engage the tab 97 of the first lever 90, and, conversely, when the feeler means 113 does not protrude through the opening 114, the latch means 116 is not in an engaging position with the tab 97. A spring 118 is attached to the member 110 and the front panel 24, and biases the member 110 such that the feeler means 113 is urged through the opening 114 in the left slide gate 38, such that the feeler means 113 then may urge a slide, placed in the slide gate, against the right slide guide 40. The member 110 is formed with a first cam surface 120, located above the latch means 116, and a second cam surface 122, located below and leading up to the latch means 116, which are selectively engaged by the tab 97 of the lever 90 pivoting the member 110, in opposition to the spring 118, to the position in which the feeler means 113 is removed from the slide gate. The additional upward pivotal motion of the first lever 90, described earlier, which is effected by the shutter actuating cam 96, allows the first lever 90 to engage the actuating arm 56 along the camming surface 58 thereof pivoting the slide clamp 44 such that the legs 46 and 48 thereof are removed from the slide guides 38 and 40 respectively, allowing for the free insertion, or removal, of a slide in the slide gate.

In operation, the slide tray and slide positioning mechanism 20 is driven by the projector motor. A typical sequence of operation involves the first lever 90 being driven upwardly by the shutter actuating cam 96 engaging the projection 94. The movement of the first lever 90 causes the second lever 98 to move the shutter members 70 and 80 to the first shutter position. Simultaneously, the tab 97 of the first lever 90 engages the camming surface 122 of the member 110, assuming that a slide is not present in a slide gate, pivoting the member 110. As the first lever 90 continues to rise, the tab 97 engages the camming surface 120 further pivoting the member 110 such that the feeler means 113 is completely removed from the slide gate. While the tab 97 is engaging the camming surface 120, the first lever 90 engages the camming surface 58 on the slide clamp actuating arm 56 pivoting the slide clamp 44 such that the legs 46 and 48 thereof are removed from the slide guides 38 and 40 respectively. At this point, the slide tray and slide positioning mechanism 20 indexes the slide tray 12 and lowers a slide therefrom into the slide gate. When the slide is completely lowered into the gate, the first lever 90 is lowered by the shutter actuating cam 96 allowing both the slide clamp 44, through spring 60, to clamp the slide against the slide guides 38 and 40 and the member 110 to pivot, under the influence of spring 118, such that the feeler means 113 enters the slide gate and shifts the slide against the right slide guide 40. At this point, the first lever 90 continues its downward path, allowing the second lever 98 to move the shutter members 70 and 80 to the second shutter position. If, in the sequence, the slide tray and slide positioning mechanism 20 encounters an empty slide position in the slide tray 12, the member 110, during the downward movement of the first lever 90, will pivot such that the feeler means 113 thereon enters and protrudes into the empty slide gate. This pivoting brings the latch means 116 on the member 110 into an engaging position with the tab 97 of the first lever 90, arresting any further downward motion of the first lever 90, thereby retaining the shutter members 70 and 80 in the first shutter position.

Figure 6:
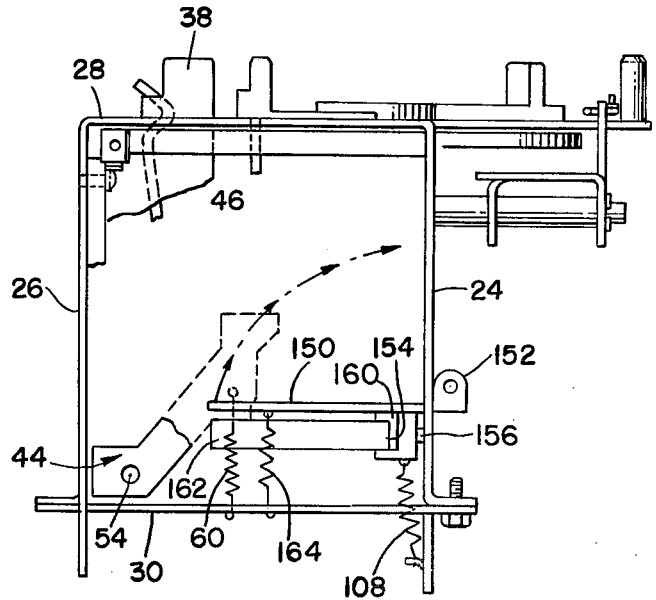
FIG. 6 is a left side elevational view of a second embodiment of the slide tray and slide positioning mechanism having the invention incorporated therein.

FIG. 6 shows a second embodiment of the invention which uses a single flat shutter member 150. The shutter member 150 is pivotally mounted to the front panel 24 on pivot rod 152 on a horizontal axis transverse the optical path A, and pivots toward the inside of the slide tray and slide positioning mechanism 20. A lever 154 is provided for controlling the shutter 150 and is pivotally mounted to the front panel 24 on a pivot pin 156. The lever 154 has a first end (not shown) for engaging the shutter actuating cam 96 and a second end having a camming surface 160 thereon for engaging the shutter 150. When the second end of the lever 154 is raised by the shutter actuating cam 96, the camming surface 160 engages the shutter member 150 pivoting the same to the closed position thereof. As in the case with the first lever 90 above, the second end of the lever 154 is further formed with the tab 162 for engaging the latch means 116 of the member 110 and the camming surfaces 120 and 122 thereof. A spring 164 is attached between the shutter 150 and the lower panel 30 for biasing the shutter member 150 toward the open position thereof.

Other embodiments and modifications of this invention as described will be apparent to those skilled in the art without departing from the spirit and scope of this invention as described by the following claims.

I claim:

1. An apparatus for projecting slides comprising:
   a frame, said frame formed with an aperture therethrough coaxial with the optical path of said apparatus;
   a gate formed in said frame co-axial with said aperture, said gate including stationary guide means for receiving slides;
   a shutter adjacent said gate, said shutter having a first position blocking the optical path of said apparatus and a second position for which the optical path of said apparatus is not blocked;
   shutter control means for moving said shutter between said first and said second positions; and
   means for sensing the absence of a slide in said gate, said sensing means including feeler means for detecting the width of a slide placed within said gate, latch means for selectively engaging said shutter control means and arresting the movement thereof when said shutter is in said first position and means for cross-relating said feeler means with said latch means whereby when said feeler means detects the absence of a slide in said slide gate, said latch means engages said shutter control means, and, conversely, when said feeler means senses the presence of a slide in said slide gate, said latching means is disengaged from said shutter control means;
   said cross-relating means comprises said feeler means and said latching means being parts of a member, said member being pivotally mounted in said frame;
   said guide means being formed with an aperture therethrough for allowing said feeler means to enter said gate.

2. The apparatus as set forth in claim 1 wherein said sensing means member further includes camming means for pivoting said member such that said feeler means is withdrawn from said gate enabling a slide to be freely inserted into or removed from said gate.

3. The apparatus as set forth in claim 2 wherein said camming means is engaged by said shutter control means.

4. The apparatus as set forth in claim 3 which further includes registering means for establishing lateral registry of a slide in said slide gate.

5. The apparatus as set forth in claim 4 wherein said registering means comprises means for biasing said member toward a position in which said feeler means thereof protrudes inside said gate.

6. The apparatus as set forth in claim 5 which further includes means for selective clamping a slide against said guide means.

7. The apparatus as set forth in claim 6 which further includes means for biasing said shutter toward said second position.

8. The apparatus as set forth in claim 7 wherein said shutter comprises a first and a second member each pivotally mounted at one end thereof to said frame, one in overlapping relation to the other, along axes parallel to said optical path.

9. The apparatus as set forth in claim 8 wherein said shutter members further include co-axial registering holes and said shutter control means comprises lever means pivotally mounted to said frame, said lever means having a pin mounted in one end thereof for engaging said registering holes in said shutter members.

10. The apparatus as set forth in claim 7 wherein said shutter is a single flat member pivotally mounted to said frame about an axis in a plane substantially normal to the optical path of said apparatus.

11. The apparatus as set forth in claim 10 which further includes:
    a housing, said apparatus located within said housing;
    a slide tray located on the exterior of said housing and adapted to contain a plurality of slides for projection by said apparatus;
    said housing including a display surface for viewing the projected image of said slides; and
    means contained within said housing for folding the optical path of said slide.

* * * * *